United States Patent [19]

Mito

[11] 4,041,797

[45] Aug. 16, 1977

[54] THROTTLE-VALVE OPERATING DEVICE FOR A CARBURETOR

[75] Inventor: Shigeo Mito, Yokohama, Japan

[73] Assignee: Kabushiki Kaisha Keihinseiki Seisakusho, Kawasaki, Japan

[21] Appl. No.: 610,732

[22] Filed: Sept. 5, 1975

[51] Int. Cl.[2] .................... F16L 5/10

[52] U.S. Cl. .................... 74/501 R; 74/470; 74/502; 74/513; 180/33 R; 261/44 R

[58] Field of Search .............. 74/501.5 R, 501 R, 506, 74/511, 513, 470, 488, 489, 491, 551.8, 551.9, 89.22, 96; 180/33 R; 261/44 R

[56] References Cited

U.S. PATENT DOCUMENTS

| | | | |
|---|---|---|---|
| 2,987,304 | 6/1961 | Roy | 261/44 R |
| 3,036,350 | 5/1962 | Hunt | 74/501.5 R |
| 3,646,829 | 3/1972 | Reno | 74/513 |

*Primary Examiner*—Samuel Scott
*Assistant Examiner*—Randall Heald

[57] ABSTRACT

In a device of the type including a throttle operating wire secured to a rotatable member operatively connected with the throttle valve, the wire is slidably covered by a tubular flexible guide having an axially extensible portion and furnished with spring means for biasing the guide portion in an extending direction. The flexible wire guide is held fixed at the opposite ends, is flexed therebetween, and is axially contractible against the spring bias when the tension of the wire exceeds a predetermined level so that stop means provided to limit the extent of closing movement of the throttle valve is kept free from any deformation as resulting from an excessive wire tension. This enables the throttle valve to assume the exact idling position and ensures desired engine idling.

2 Claims, 1 Drawing Figure

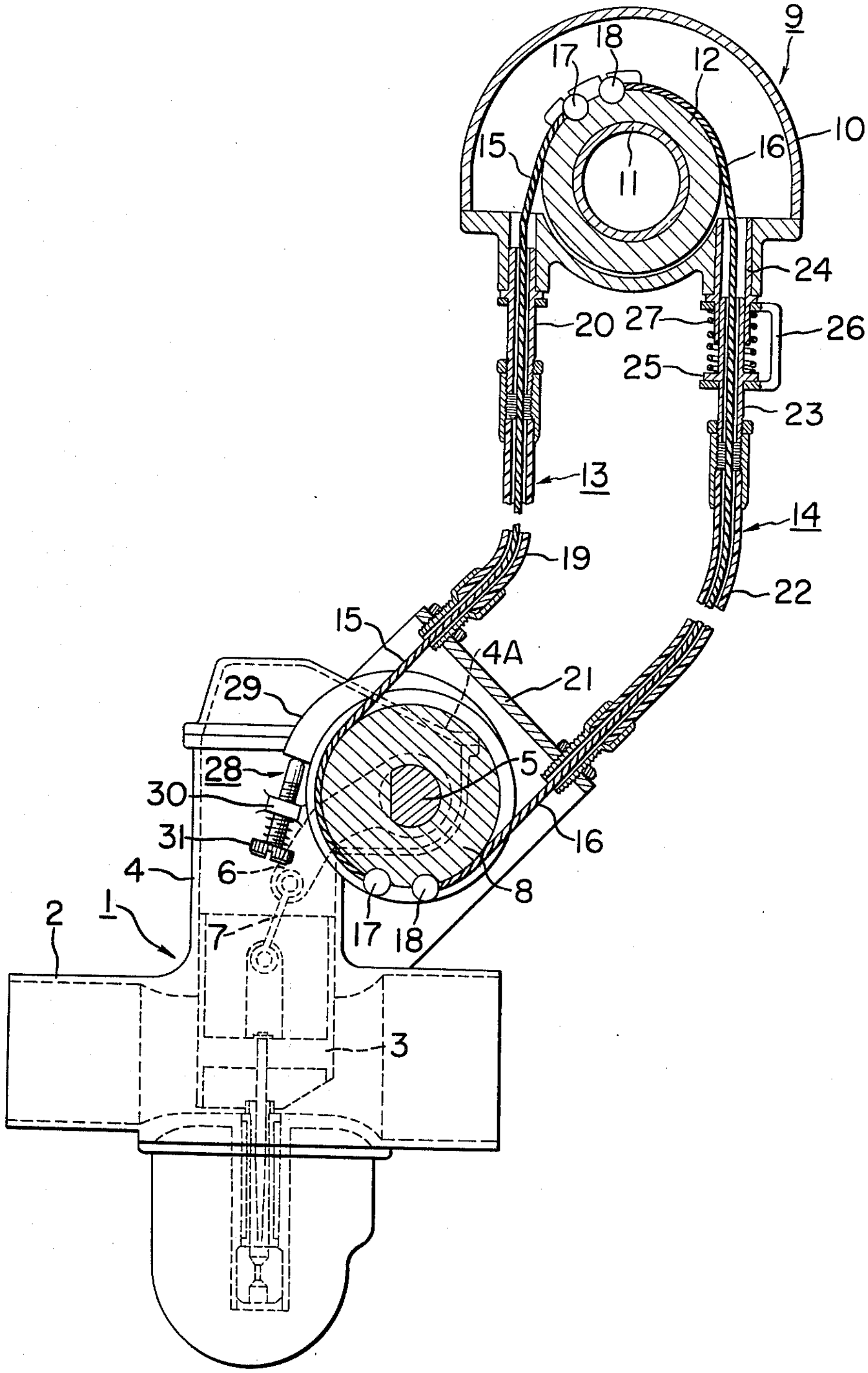
9
18
17
12
10
15
16
11
24
20
27
26
25
23
13
14
19
22
15
4A
21
29
28
5
30
16
31
4
6
8
2
1
7
17
18
3

THROTTLE-VALVE OPERATING DEVICE FOR A CARBURETOR

BACKGROUND OF THE INVENTION

This invention relates generally to throttle-valve operating devices for carburetors and more particularly to those of the type including a throttle-valve actuating member rotatably mounted on the carburetor, a manual control member rotatably supported exteriorly of the carburetor, and two respective throttle-opening and throttle-closing wires interconnecting the throttle-valve actuating and manual control members for forced throttle-opening and-closing operation.

In general, with this type of throttle-valve operating device, in its operation to close the throttle valve, the force of pull of the throttle-closing or operating wire acts directly upon idling stop means normally provided on the carburetor to limit the extend of closing movement of the throttle valve to define an idling position therefor. Accordingly, when the throttle valve is closed under any large force of operation, the idling stop is unavoidably deformed to a more or less extent. This makes the throttle valve unable to remain in the exact idling position desired, involving a disadvantage of causing disorderly engine idling.

SUMMARY OF THE INVENTION

The present invention has for its object the provision of a throttle-valve operating device of the type concerned which is designed to overcome such disadvantage conventionally encountered as described above and simple in structure.

According to the present invention there is provided for a carburetor a throttle-valve operating device of the type concerned which comprises a tubular flexible guide covering the throttle operating wire and including an axially extensible portion and spring means for biasing the axially extensible portion in an extending direction under a predetermined pressure, the tubular flexible guide being held fixed at the opposite ends and flexed therebetween.

According to a further feature of the present invention, there is provided a throttle-operating device of the character described in which an abutment member is provided on the tubular flexible guide to set a maximum limit on axial extension of the axially extensible portion thereof.

The above and other objects, features and advantages of the present invention will become apparent from the following description when taken in conjunction with the accompanying drawing.

BRIEF DESCRIPTION OF THE DRAWING

The drawing includes a single FIGURE which represents a side elevational view, partly in longitudinal cross section, of a preferred embodiment of the present invention as applied to a motorcycle engine.

DESCRIPTION OF THE PREFERRED EMBODIMENT

In the drawing, there is shown a carburetor 1 of a motorcycle which is of the structure including a suction barrel 2 connected to the engine, a piston type throttle valve 3 arranged in the suction barrel 2, and a throttle-valve guide barrel 4 formed to guide the throttle valve 3 for vertical movement therein to open and close the suction barrel 2. Formed on the top portion of the guide barrel 4 integrally therewith is a bulged chamber 4A in which a rotative shaft 5 is journaled with a lever arm 6 fixedly secured to the shaft 5 midway of its axial length and pivotally connected with the throttle valve 3 through the intermediary of a link 7. A pulley type throttle-valve actuating member 8 is fixedly mounted on one end of the rotative shaft 5 which extends laterally from the bulged chamber 4A.

Reference numeral 9 designates a hand-operated control structure provided, for example, on the steering handle of the motorcycle and including a support frame 10 and a hand grip 11 rotatably supported thereon with a pulley type operating member 12 fixedly mounted on the hand grip 11. The operating member 12 is operatively connected with the throttle-valve actuating member 8, mounted on the carburetor barrel 4, by means of a throttle-opening and a throttle-closing wire 15 and 16 slidably covered by tubular flexible guides 13 and 14, respectively. The two wires 15 and 16 are each secured at the opposite ends to the operating member 12 and throttle-valve and actuating member 8 by anchor means 17 or 18.

The tubular flexible guide 13 provided for the throttle-opening or operating wire 15 is comprised of a flexible tubing 19 secured at one end to a bracket 21 fixedly mounted on the carburetor 1 and a tubular fitting 20 firmly fitted at one end in the support frame 10 on the steering handle of the motorcycle and to the other end of which fitting the flexible tubing 19 is threadably connected at the other end thereof so that the tubular guide 13 is adjustable in overall length.

On the other hand, the tubular flexible guide 14 provided for the throttle-closing or operating wire 16 is comprised of a flexible tubing 22 secured at one end to the bracket 21, a first tubular fitting 23 threadably connected at one end to the other end of the flexible tubing 22, and a second tubular fitting 24 firmly fitted at one end in the support frame 10 and slidably fitted at the other end over the other end portion of the first tubular fitting 23.

Reference numeral 26 designates a U-shaped abutment member having one leg portion fixedly over the second tubular fitting 24 and the other leg portion slidably fitted over the lower portion of the first tubular fitting 23. Arranged between the two leg portions of the U-shaped abutment member 26 in encircling relation to the interfitting portions of the first and second tubular fittings 23 and 24 is a coiled compression spring 27 which is seated at the bottom end against a radially outwardly extending annular flange 25 formed on the first tubular fitting 23 intermediate the ends thereof to press the flange 25 against the inside surface of the lower leg portion of the U-shaped abutment member 26 under a predetermined pressure.

In this manner, the first tubular fitting 23 is normally held in its lowermost position under the bias of compression spring 27, imparting a maximum of overall length to the tubular guide 14. As shown, the flexible tubing 22 in the state assembled in fixed relation to the bracket 21 is flexed to an appropriate extent so that the tubular guide 14 as a whole is axially contractible or reducible in axial length against the bias of the compression spring 27, as will be described below in detail.

Reference numeral 28 generally designates idling stop means provided to define an idling position of the throttle valve and including an abutment formation 29 on the outer periphery of the throttle-valve actuating member 8 and a stop screw 31 threaded in a boss 30, formed on the outside of guide barrel 4 of the carburetor 1 for abutting engagement with the adjacent end face of abutting formation 29.

In operation of the throttle-valve operating device described, when the hand grip 11 is manually turned clockwise, as viewed in the drawing, the throttle-opening wire 15 is pulled to turn the throttle-valve actuating member 8 clockwise so that the throttle valve 3 is lifted to open. On this occasion, the throttle-closing wire 16 is run through the tubular guide 14 only following the rotation of the operating member 12 and valve-actuating member 8, to which the wire 16 is anchored as at 18.

Contrariwise, when hand grip 11 is turned counterclockwise the throttle operating wire 16 is pulled in a direction to close the throttle valve 3 and the latter assumes its idling position as determined by the stop screw 31, with which the abutment formation 29 on the throttle-valve actuating member 8 is brought into abutting engagement. On this occasion, if the hand grip 11 is further turned with an increasing torque to exert on the wire 16 a pulling force exceeding a predetermined valve, the flexed portion of the flexible tubing 22 of the tubular guide 14 is forced laterally by the wire tensioned in a straightening direction and the tubular guide 14 is subjected as a whole to a compressive force exceeding the set pressure of compressive spring 27 so that the latter is further compressed allowing the first and second tubular fittings 23 and 24 to slide relative to each other in a direction to reduce the combined length thereof and hence the overall length of the tubular guide 14.

The throttle-valve actuating member 8 is therefore subjected only to a turning torque corresponding to the product of its radius and the force of compression acting on the spring 27. Accordingly, there arises no unduly high pressure of abutting engagement between the stop screw 31 arranged on the carburetor barrel 4 and the abutting formation 29 on the throttle-valve actuating member 8.

As will readily be appreciated from the foregoing description, according to the present invention, the idling stop means 28 are kept free from any undesirable deformation resulting in error of the idle opening of the throttle valve 3 even if, in the closing operation of the throttle valve, an excessively lrge operating effort or tension is imposed on the wire 16. This eliminates the danger of causing any disorderly engine idling and facilitates the throttle-closing operation, allowing the driver to operate to close the throttle valve without any particular control of manual force of operation. Moreover, the device of the present invention is extremely simple in structure, including a tubular flexible guide 14 for the throttle-closing wire which has an axially extensible guide portion and is contractible under a force of compression exceeding a predetermined valve.

While one preferred embodiment of the invention has been shown and described, it will be apparent to those skilled in the art that various changes and modifications may be made without departing from the spirit of the invention or the scope of the appended claims.

What is claimed is:

1. A throttle-valve operating device for a carburetor, of the type including a throttle-valve actuating member rotatably mounted on the carburetor, a manual control member rotatably supported exteriorly of the carburetor, and a throttle operating wire interconnecting said actuating member and said control member; the device comprising a tubular flexible guide slidably covering said wire and including a guide having two portions axially slidable with respect to one another and spring means for biasing said guide portion in an extending direction under a predetermined pressure, said flexible guide being held fixed at opposite ends and flexed therebetween.

2. The device as defined in claim 1, further comprising an abutment member fixed between said portions of the guide to set a maximum limit on axial sliding of one of said portions of the guide.

* * * * *